(12) United States Patent
Ryon et al.

(10) Patent No.: US 11,566,565 B2
(45) Date of Patent: Jan. 31, 2023

(54) ACCESS HATCH FOR INTERNALLY MOUNTED TORCH IGNITOR

(71) Applicant: Delavan Inc., West Des Moines, IA (US)

(72) Inventors: Jason Ryon, Carlisle, IA (US); Lev A. Prociw, Johnston, IA (US); Brandon Phillip Williams, Johnston, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 22 days.

(21) Appl. No.: 17/133,303

(22) Filed: Dec. 23, 2020

(65) Prior Publication Data

US 2022/0195940 A1    Jun. 23, 2022

(51) Int. Cl.
  *F02C 7/264*    (2006.01)
(52) U.S. Cl.
  CPC .......... *F02C 7/264* (2013.01); *F05D 2220/32* (2013.01); *F05D 2230/72* (2013.01); *F05D 2230/80* (2013.01); *F05D 2240/35* (2013.01); *F05D 2260/99* (2013.01)
(58) Field of Classification Search
  None
  See application file for complete search history.

(56) References Cited

U.S. PATENT DOCUMENTS

| 3,990,834 A | * | 11/1976 | DuBell | F02C 7/18 |
| | | | | 60/39.821 |
| 4,112,675 A | | 9/1978 | Pillsbury et al. | |
| 4,194,358 A | | 3/1980 | Stenger | |
| 4,412,414 A | | 11/1983 | Novick et al. | |
| 4,860,533 A | | 8/1989 | Joshi | |
| 5,113,647 A | * | 5/1992 | Shekleton | F23R 3/28 |
| | | | | 60/738 |

(Continued)

FOREIGN PATENT DOCUMENTS

GB        616635 A      1/1949

OTHER PUBLICATIONS

Extended European Search Report dated May 20, 2022, issued during the prosecution of European Patent Application No. EP 21217134.2.

*Primary Examiner* — Ehud Gartenberg
*Assistant Examiner* — Jacek Lisowski
(74) *Attorney, Agent, or Firm* — Locke Lord LLP; Joshua L. Jones; Scott D. Wofsy

(57) ABSTRACT

An embodiment of an ignition system for a gas turbine engine includes a high pressure engine case, a torch ignitor disposed at least partially within the high pressure engine case, the torch ignitor having a combustion chamber oriented about a torch axis, the combustion chamber having axially upstream and downstream ends defining a flow direction through the combustion chamber, along the axis. The ignition system also includes an access hatch configured to allow access through a high pressure engine case to the cap and to seal against the high pressure engine case when not accessing the cap. An embodiment of a method includes removing a hatch from a high pressure engine case to open a hatch opening, performing maintenance on a torch ignitor that is inside the high pressure engine case by accessing the torch ignitor through the hatch opening, replacing the hatch to close the hatch opening after completion of maintenance on the torch ignitor.

15 Claims, 4 Drawing Sheets

(56) References Cited

U.S. PATENT DOCUMENTS

| | | | |
|---|---|---|---|
| 8,303,243 B2 | 11/2012 | Fish et al. | |
| 9,080,772 B2* | 7/2015 | Prociw | F23R 3/14 |
| 10,727,656 B2* | 7/2020 | Waitkus | F01D 9/065 |
| 2004/0168442 A1 | 9/2004 | Schmotolocha et al. | |
| 2005/0053876 A1 | 3/2005 | Joos et al. | |
| 2007/0200012 A1 | 8/2007 | Hernandez et al. | |
| 2011/0088409 A1* | 4/2011 | Carlisle | F23R 3/283 29/700 |
| 2012/0119633 A1* | 5/2012 | McCarvill | F01D 25/24 16/2.1 |
| 2012/0312707 A1 | 12/2012 | Baten | |
| 2014/0366505 A1 | 12/2014 | Prociw et al. | |
| 2018/0003388 A1* | 1/2018 | Park | F23R 3/34 |
| 2019/0010872 A1 | 1/2019 | Dam et al. | |
| 2019/0032561 A1 | 1/2019 | Stoia et al. | |
| 2021/0215100 A1 | 7/2021 | Head et al. | |

\* cited by examiner

ACCESS HATCH FOR INTERNALLY MOUNTED TORCH IGNITOR

BACKGROUND

The present disclosure relates to gas turbine engines and, more particularly, torch ignitors and methods suitable for use in torch ignitors used in the combustor section of a gas turbine engine.

Torch ignitors can be used in lieu of spark ignitors to provide an ignition source for combustors located in gas turbine engines. Torch ignitors provide a flame to the combustion chamber of a gas turbine engine as an ignition source rather than the electric current provided by spark ignitors. Consequently, torch ignitors can provide a larger target for fuel injectors within the combustor, allowing for utilization of a greater range of fuel injector designs. Torch ignitors are intended to remain active while the gas turbine is operating. Due to their position, torch ignitor components can often be difficult to reach for routine maintenance or replacement. There remains a need for improved access to ignitor components allowing for line replacement and/or repair within the system.

SUMMARY

An ignition system for a gas turbine engine includes a high pressure engine case, a torch ignitor disposed at least partially within the high pressure engine case, the torch ignitor having a torch-ignitor combustion chamber oriented about a torch axis, the torch-ignitor combustion chamber having axially upstream and downstream ends defining a flow direction through the torch-ignitor combustion chamber, along the axis The torch ignitor includes a cap defining the axially upstream end of the torch-ignitor combustion chamber and oriented about the axis, wherein the cap is configured to receive a fuel injector and at least one glow plug and a tip connected to a downstream end of the elbow for issuing flame. The ignition system also includes an access hatch configured to allow access through the high pressure engine case to the cap and to seal against the high pressure engine case when not accessing the cap.

An embodiment of a method includes removing a hatch from a high pressure engine case to open a hatch opening, performing maintenance on a torch ignitor that is inside the high pressure case by accessing the torch ignitor through the hatch opening, replacing the hatch to close the hatch opening after completion of maintenance on the torch ignitor.

DETAILED DESCRIPTION

The present disclosure presents structures and methods for replacing and/or repairing a torch ignitor suitable for igniting the combustor of a gas turbine engine.

The following are non-exclusive descriptions of possible embodiments of the present disclosure. Ignition systems with internally mounted torch ignitors may include components (e.g. fuel injectors and hot surface ignitors, or glow plugs) that are mounted to be line replaceable. However, because these components may be mounted within a high pressure casing, they may be hard to access. Therefore, as described herein, this disclosure provides an access hatch that can be added to the system to allow access to replace these components and perform other maintenance.

Figure 1:
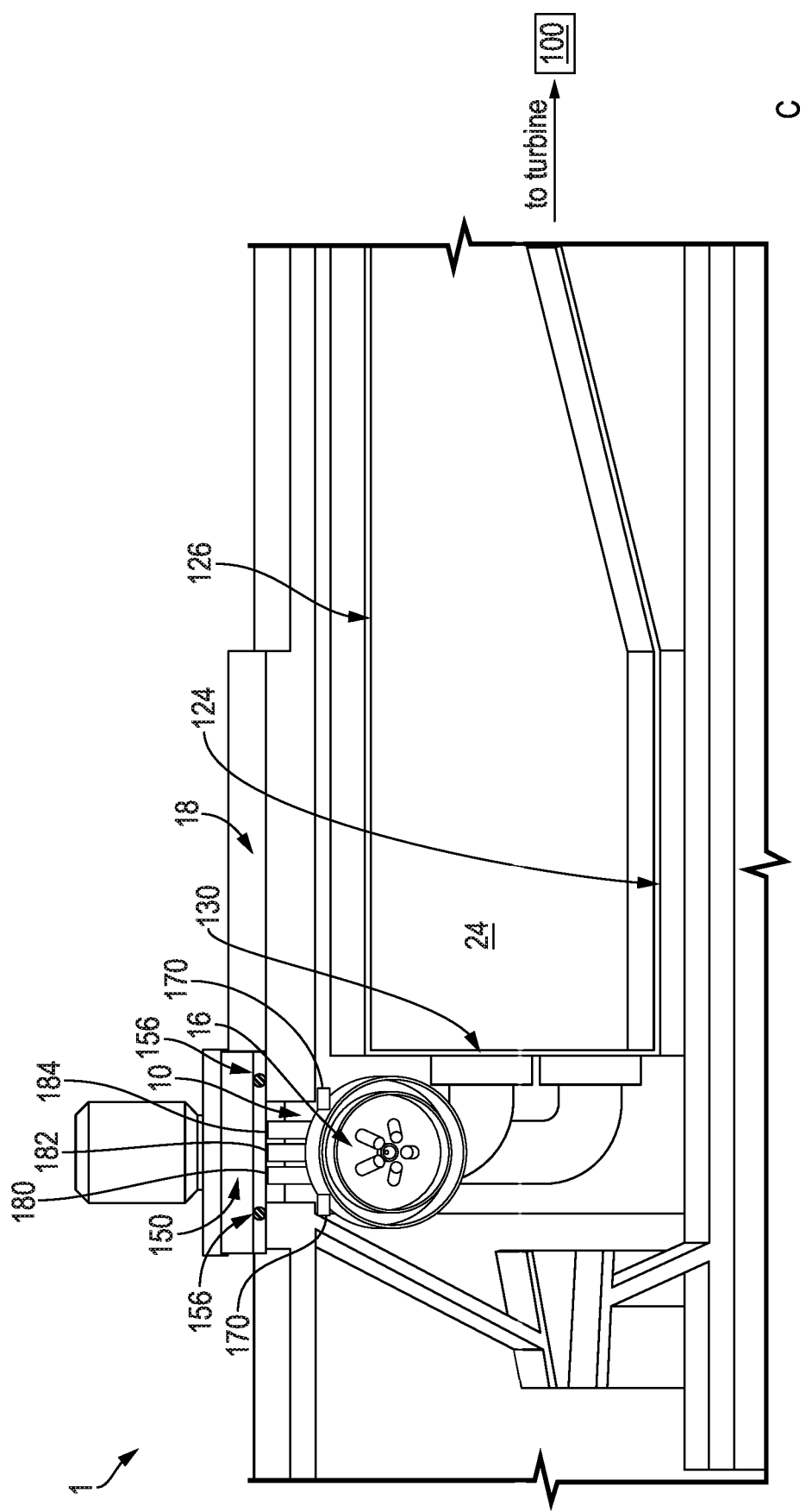
FIG. 1 is a cross-sectional side elevation view of an example of a torch ignitor within the combustion section of a gas turbine engine and an access hatch.
Figure 2:
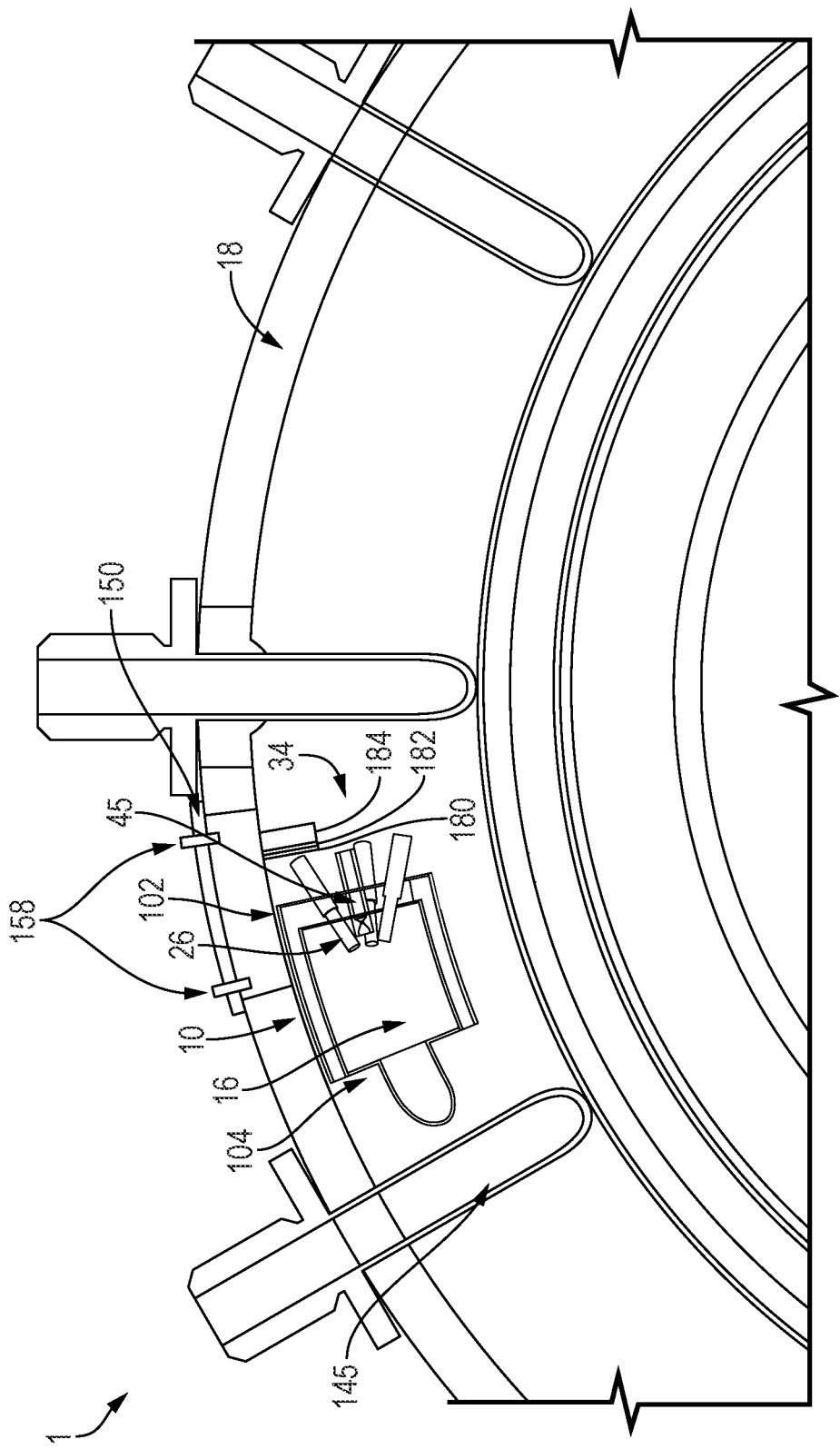
FIG. 2 is a cross-sectional axial view looking in an upstream direction of the combustor of FIG. 1.
Figure 3:
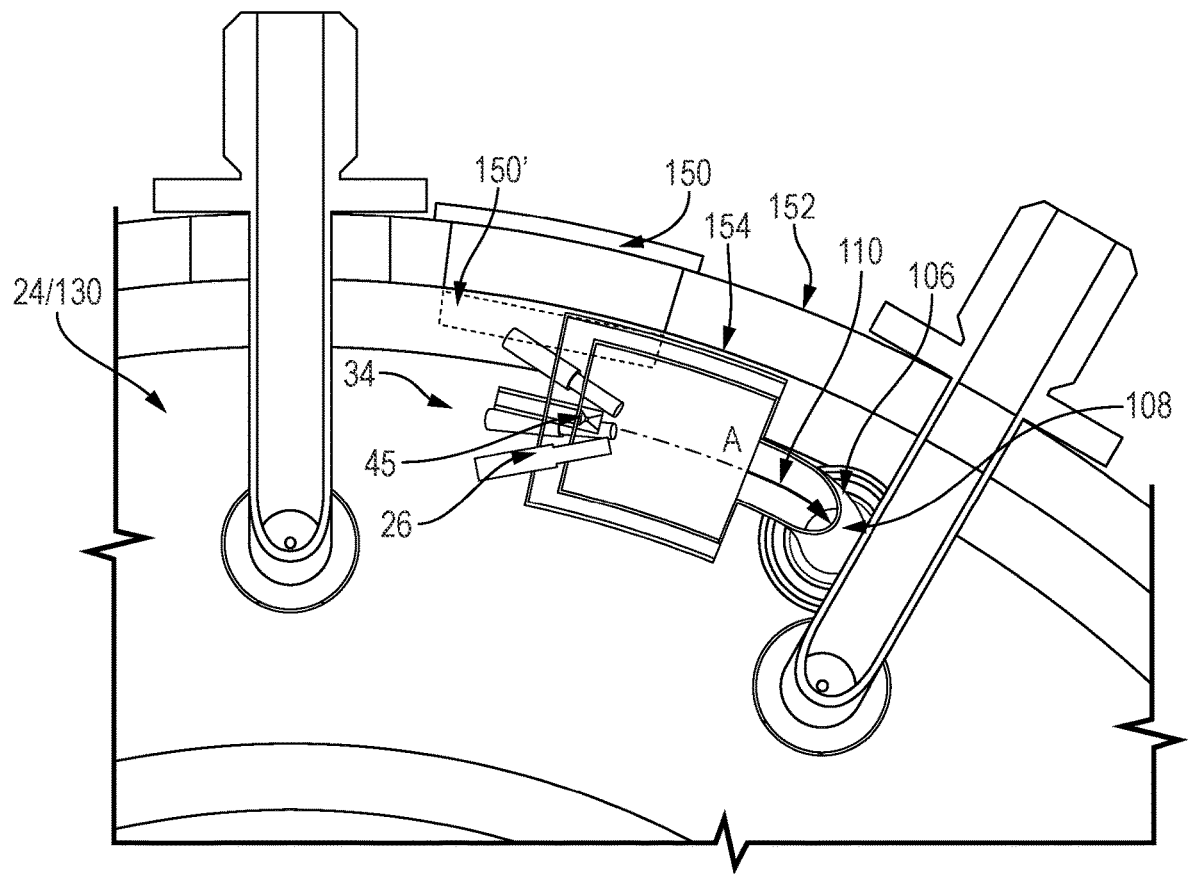
FIG. 3 is a cross-sectional axial view looking in a downstream direction of the combustor of FIG. 1.

FIG. 1 is a cross sectional view of an ignition system 1 for a gas turbine engine 100, where the torch ignitor 10 can include a torch-ignitor combustion chamber 16 oriented about a torch axis A (axis shown in FIG. 3). The torch-ignitor combustion chamber 16 can have axially upstream and downstream ends 102, 104 defining a flow direction through the torch-ignitor combustion chamber 16, along the axis A (e.g. as also shown in FIG. 3). Because in FIG. 1 the torch ignitor 10 is oriented tangent to an engine axis C, only the upstream end 102 of the torch-ignitor combustion chamber 16 is visible. A cap 34 can define the axially upstream end 102 of the torch-ignitor combustion chamber 16 and can also be oriented about the axis A (e.g. as shown in FIG. 2). The cap 34 may be separable from the torch wall 16, or may be formed integrally with the torch wall 16. In the example shown in FIG. 2, the cap 34 can be configured to receive a fuel injector 45 and at least one glow plug 26. The torch ignitor can include a tip 106 at a downstream end 104 of the torch-ignitor combustion chamber 16 for issuing combustion products (e.g. flame), for example through an elbow 108 and into a main combustor 24 as shown in FIG. 3.

The ignition system 1, can further include an access hatch 150. The access hatch 150 can be defined in a high pressure engine case 18, and can be positioned to allow access through the high pressure engine case 18 to the cap 34. For example, the access hatch 150 can be positioned so as to provide access to change glow plugs 26, a fuel line, or even the entire torch 10, though replacing the entire torch could require greater sealing than described herein. In embodiments, electrical connections 180 for hot surface ignitors (e.g. glow plug 26), a fuel input 182 for fuel injector 45, and auxiliary atomization air lines 184 (e.g. high pressure gas assist for fuel injector 45) can be connected through the high pressure case 18 for access through hatch 150, or can be routed through other ports to have access to manipulate the components through the access hatch 150.

The access hatch 150 can also be configured to seal against the high pressure engine case 18 when not accessing the cap 34. In embodiments, such as the example shown in FIG. 1-2, the access hatch 150 can be mounted to an outside surface 152 of the high pressure engine case 18 proximate the cap 34. It is contemplated that the access hatch 150 can also be mounted to an inside surface 154 of the high pressure engine case 18 proximate the cap 34, for example as shown as 150' in broken lines in FIG. 3. Mounting the access hatch 150 inside the high pressure engine case 18 allows the access hatch 150' to take advantage of the air pressure within the high pressure casing 18 to help seal the access hatch 150' against the high pressure engine case 18. As shown in FIG. 1, the access hatch 150 can be sealed to the high pressure case with a seal such as c-seals 156. In embodiments, the access hatch 150 can be attached to the high pressure case with at least one of bolts, studs, nuts, threads, and/or clamping, such as fasteners 158 shown in FIG. 2. Those skilled in the art will readily appreciate that the access hatch 150 can be sealed against the high pressure engine case 18 with any other suitable sealing and/or fastening methods, and any suitable combination thereof.

The torch ignitor 10 can include an elbow 108 connected to the downstream end 104 of the torch-ignitor combustion chamber 16 for diverting flame along an ignition jet flame axis. The ignition jet flame axis can be off of the torch axis A for tangential, radial, or axial injection of flame into a gas turbine engine combustor (e.g. main combustor 24). The torch ignitor 10 can also include a tip 106 at a downstream end of the elbow for issuing the injection of flame (e.g. as shown in FIG. 3). By including an elbow 108 on torch ignitor 10, the tip 106 of the torch ignitor 10 can be independent of the axis of the torch-ignitor combustion chamber 16 of the torch 10, e.g. axis A. This configuration can provide added flexibility as to placement of torch ignitor 10 and its components (e.g., torch-ignitor combustion chamber 16), relative to the location and angle of the torch flame 110 that enters into the main combustor 24. As shown in FIG. 3, the tip 106 can be oriented to outlet from the combustion chamber 16 in a radial direction relative to the torch axis A, for example along the arrow 110.

The cap 34 may be mounted to the high pressure engine case 18 while the tip 106 may be mounted to the main combustor 24 within the high pressure case 18. In this way, it is possible for the main combustor 24 to be in fluid communication with combustion products from the torch torch-ignitor combustion chamber 16. In embodiments, it is possible that the combustion products within torch torch-ignitor combustion chamber 16 may be produced from fuel and pressurized oxygen containing gas from sources outside the high pressure engine case 18. Additionally, or alternatively, the torch ignitor 10 itself may be mounted to the high pressure case 18, such as shown in FIG. 1. It is possible that the torch ignitor 10 and cap 34 are both mounted to the high pressure case 18 by support brackets 170 for example, however any suitable attaching means may be used.

As shown in FIGS. 2-3, torch ignitor 10 contains its own fuel injector 45, while the main combustor 24 may have plurality of main fuel injectors 145 which can be mounted to the main combustor 24 as shown. It is contemplated that for each torch ignitor 10, the torch-ignitor combustion chamber 16 can be outside of the main combustor 24, such as shown in FIG. 1. Additionally, none of the main fuel injectors 145 includes its own torch-ignitor combustion chamber outside of the main combustor 24.

As shown in FIG. 1, the main combustor 24 can be annular and can include an inner wall 124 and an outer wall 126 spaced radially apart from one another. A combustor dome wall 130 can join the inner and outer walls 124,126 of the main combustor 24, such that the main fuel injectors 145 can be mounted to the combustor dome wall 130. In embodiments such as the example shown in FIG. 1, the torch-ignitor combustion chamber 16 can be positioned forward of the combustor dome wall 130 such that the torch axis A is oriented circumferentially relative to the engine axis C and so that the elbow 108 turns from the torch axis A to an aft facing direction. In this configuration, the tip 106 of the torch ignitor can be mounted to the combustor dome wall 130 (e.g. as shown in FIG. 3). When the torch ignitor 10 and torch-ignitor combustion chamber 16 are positioned forward of the main combustor 24, the access hatch 150 forward relative to the combustor dome wall 130 in a direction along the engine axis C. Though not shown in the drawings, it is contemplated that the ignition system 1 may include a plurality of torch ignitors 10 each mounted to the main combustor 24 as described above, and space circumferentially around the main combustor 24. In such a case, the system 1 can include a plurality of access hatches 150, for example, a respective access hatch 150 for each respective torch ignitor 10.

Though not shown, it is appreciated by those skilled in the art that the torch-ignitor combustion chamber 16 can also be positioned aft of the combustor dome wall 130, where the torch-ignitor combustion chamber 16 can be positioned radially outward of a portion of the outer wall 124 relative to the engine axis C, but can still be within the high pressure engine case 18. In this case the torch axis A can still be oriented circumferentially relative to the engine axis C, but the tip 106 can be mounted to the outer wall 126, rather than the combustor dome wall 130.

Figure 4:
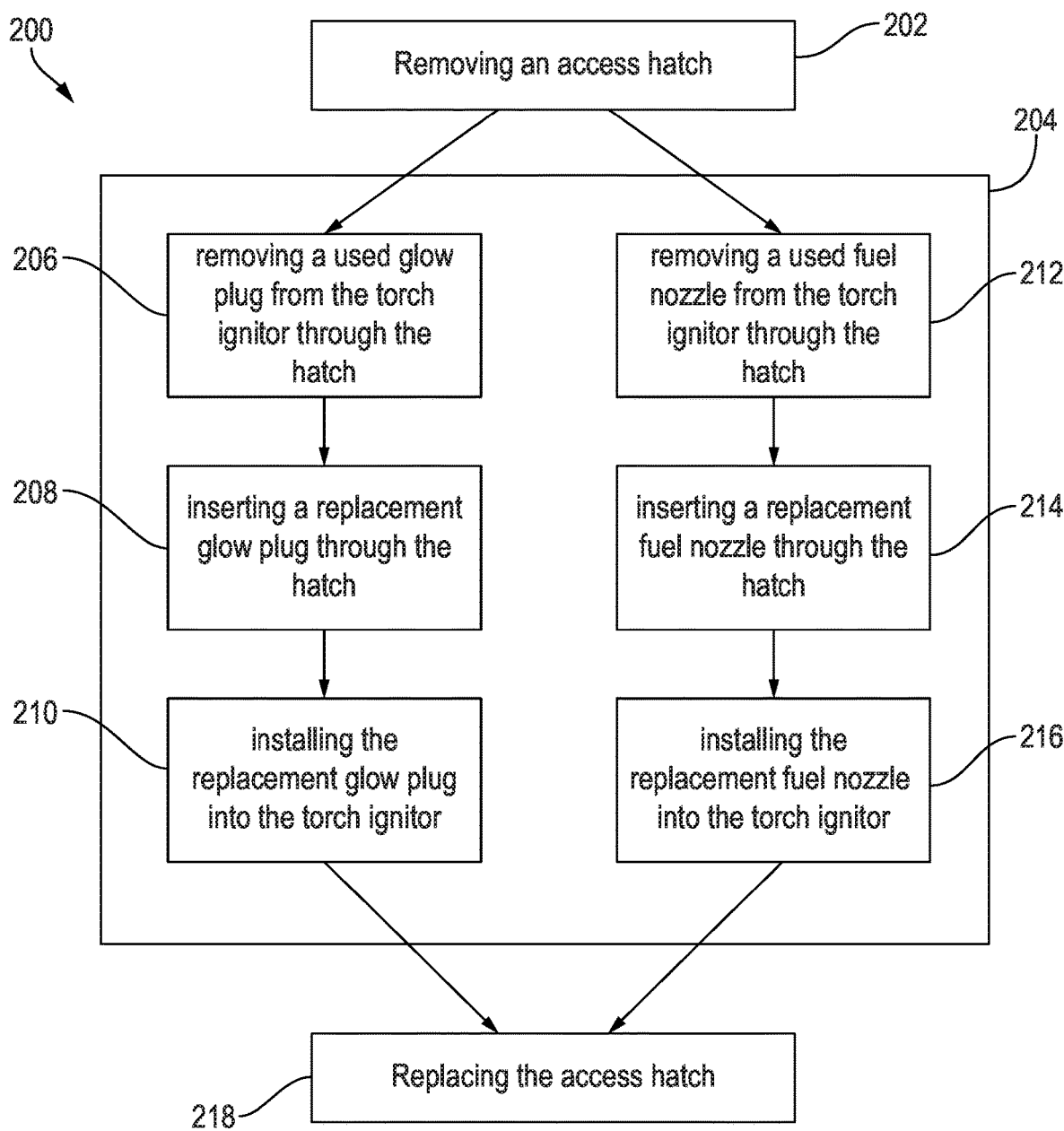
FIG. 4 is a schematic box diagram of a method in accordance with at least one aspect of this disclosure.

Shown in FIG. 4, an embodiment of a method 200 can include, at box 202 removing a hatch from a high pressure engine case to open a hatch opening. At box 204, the method 200 can include performing maintenance on a torch ignitor that is inside the high pressure case by accessing the torch ignitor through the hatch opening.

In embodiments of the method 200, at box 206, performing maintenance on the torch ignitor can include removing a used glow plug from the torch ignitor through the hatch opening, inserting a replacement glow plug through the hatch opening (e.g. at box 208), and/or installing the replacement glow plug into the torch ignitor (e.g. at box 210).

In further embodiments of the method 200, at box 212, performing maintenance on the torch ignitor can include removing a used fuel injector from the torch ignitor through the hatch opening, inserting a replacement fuel injector through the hatch opening (e.g. box 214), and/or installing the replacement fuel injector into the torch ignitor (e.g. box 216). As shown at box 218, the method 200 can include replacing the hatch to close the hatch opening after completion of maintenance on the torch ignitor.

Discussion of Possible Embodiments

The following are non-exclusive descriptions of possible embodiments of the present disclosure.

An embodiment of an ignition system for a gas turbine engine includes a high pressure engine case, a torch ignitor disposed at least partially within the high pressure engine case, the torch ignitor having a torch-ignitor combustion chamber oriented about a torch axis, the torch-ignitor combustion chamber having axially upstream and downstream ends defining a flow direction through the torch-ignitor combustion chamber, along the axis The torch ignitor includes a cap defining the axially upstream end of the torch-ignitor combustion chamber and oriented about the axis, wherein the cap is configured to receive a fuel injector and at least one glow plug and a tip connected to a downstream end of the elbow for issuing flame. The ignition system also includes an access hatch configured to allow access through the high pressure engine case to the cap and to seal against the high pressure engine case when not accessing the cap.

The system of the preceding paragraph can optionally include, additionally and/or alternatively, any one or more of the following features, configurations and/or additional components:

A further embodiment of the foregoing system, wherein the cap is mounted inside the high pressure engine case and the tip is mounted to a main combustor within the high pressure engine case for fluid communication of combustion products from the torch-ignitor combustion chamber into the main combustor.

A further embodiment of any of the foregoing systems, wherein access the access hatch is mounted to an outside surface of the high pressure case proximate the cap.

A further embodiment of any of the foregoing systems, wherein the access hatch is mounted to an inside surface of the high pressure case proximate the cap.

A further embodiment of any of the foregoing systems can further include, an elbow connected to the downstream end of the torch-ignitor combustion chamber for diverting combustion products along an ignition jet flame axis that is off of the torch axis for injection of flame into the main combustor.

A further embodiment of any of the foregoing systems can further include a plurality of main fuel injectors mounted to the main combustor, wherein the torch torch-ignitor combustion chamber is outside of the main combustor, and wherein none of the main fuel injectors includes a torch-ignitor combustion chamber outside of the main combustor.

A further embodiment of any of the foregoing systems, wherein the main combustor is annular and includes an inner wall and an outer wall spaced radially apart from one another, and wherein a combustor dome wall joins the inner and outer walls, wherein the fuel injectors are mounted to the combustor dome wall.

A further embodiment of any of the foregoing systems, wherein the tip is mounted to the combustor dome wall.

A further embodiment of any of the foregoing systems, wherein the access hatch is forward relative to the combustor dome wall in a direction along the engine axis.

A further embodiment of any of the foregoing systems, wherein the access hatch is sealed using a c-seal.

A further embodiment of any of the foregoing systems, wherein the access hatch is attached to the high pressure case with at least one of bolts, studs, nuts, threads, and/or clamping.

An embodiment of a method includes removing a hatch from a high pressure engine case to open a hatch opening, performing maintenance on a torch ignitor that is inside the high pressure case by accessing the torch ignitor through the hatch opening, replacing the hatch to close the hatch opening after completion of maintenance on the torch ignitor.

A further embodiment of the foregoing method, wherein performing maintenance on the torch ignitor includes, removing a used glow plug from the torch ignitor through the hatch opening, inserting a replacement glow plug through the hatch opening, installing the replacement glow plug into the torch ignitor.

A further embodiment of the foregoing method, wherein performing maintenance on the torch ignitor includes removing a used fuel nozzle from the torch ignitor through the hatch opening, inserting a replacement fuel nozzle through the hatch opening, installing the replacement fuel nozzle into the torch ignitor.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An ignition system for a gas turbine engine, the ignition system comprising:
    a high pressure engine case defining an engine axis;
    a torch ignitor disposed at least partially within the high pressure engine case, having a torch-ignitor combustion chamber oriented about a torch axis that is oriented circumferentially with respect to the engine axis, the torch-ignitor combustion chamber having axially upstream and downstream ends defining a flow direction through the combustion chamber, along the axis;
        a cap defining the axially upstream end of the torch-ignitor combustion chamber and oriented about the axis, wherein a fuel injector and at least one glow plug are seated in the cap; and
        a tip at a downstream end of the torch-ignitor combustion chamber for issuing flame; and
    an access hatch configured to allow access through the high pressure engine case to the cap and to seal against the high pressure engine case when not accessing the cap, wherein the access hatch and the combustion chamber of the torch ignitor are forward relative to a combustor dome wall of a main combustor in a direction along the engine axis, and wherein the access hatch is radially outboard of the cap, fuel injector, and glow plug relative to the engine axis.

2. The ignition system as recited in claim 1, wherein the cap is mounted inside the high pressure engine case and the tip is mounted to the main combustor within the high pressure engine case for fluid communication of combustion products from the torch-ignitor combustion chamber into the main combustor.

3. The ignition system as recited in claim 2, wherein the access hatch is mounted to an outside surface of the high pressure engine case proximate the cap.

4. The ignition system as recited in claim 2, wherein the access hatch is mounted to an inside surface of the high pressure engine case proximate the cap.

5. The ignition system as recited in claim 2, further comprising an elbow connected to the downstream end of the torch-ignitor combustion chamber for issuing combustion products along an ignition jet flame axis that is off of the torch axis for injection of combustion products into the main combustor.

6. The ignition system as recited in claim 2, further comprising a plurality of main fuel injectors mounted to the main combustor, wherein the torch-ignitor combustion chamber is outside of the main combustor, and wherein none of the plurality of main fuel injectors includes a torch-ignitor combustion chamber outside of the main combustor.

7. The ignition system as recited in claim 6, wherein the main combustor is annular and includes an inner wall and an outer wall spaced radially apart from one another, and wherein a combustor dome wall joins the inner and outer walls, wherein the plurality of main fuel injectors are mounted to the combustor dome wall.

8. The ignition system as recited in claim 7, wherein the tip is mounted to the combustor dome wall.

9. The ignition system as recited in claim 4, wherein the access hatch is sealed using a c-seal.

10. The ignition system as recited in claim 4, wherein the access hatch is attached to the high pressure engine case with at least one of bolts, studs, nuts, threads, and/or clamping.

11. A method comprising:
    removing the access hatch as recited in claim 1 from the high pressure engine case to open a hatch opening;

and performing maintenance on the torch ignitor that is inside the high pressure engine case by accessing the torch ignitor through the hatch opening.

12. The method as recited in claim 11, further comprising replacing the access hatch to close the hatch opening after completion of maintenance on the torch ignitor.

13. The method as recited in claim 11, wherein performing maintenance on the torch ignitor includes:
removing a used glow plug from the torch ignitor through the hatch opening;
inserting a replacement glow plug through the hatch opening; and
installing the replacement glow plug into the torch ignitor.

14. The method as recited in claim 11, wherein performing maintenance on the torch ignitor includes:
removing a used fuel injector from the torch ignitor through the hatch opening;
inserting a replacement fuel injector through the hatch opening; and
installing the replacement fuel injector into the torch ignitor.

15. The ignition system as recited in claim 8, wherein the tip is aligned to issue a flame from the torch ignitor from the combustor dome wall in parallel with the plurality of main fuel injectors of the main combustor.

* * * * *